W. J. GOSNAY.
SHIFTING GUIDE FOR CORN PLANTERS.
APPLICATION FILED JULY 26, 1913.
1,078,846.
Patented Nov. 18, 1913.
2 SHEETS—SHEET 1.
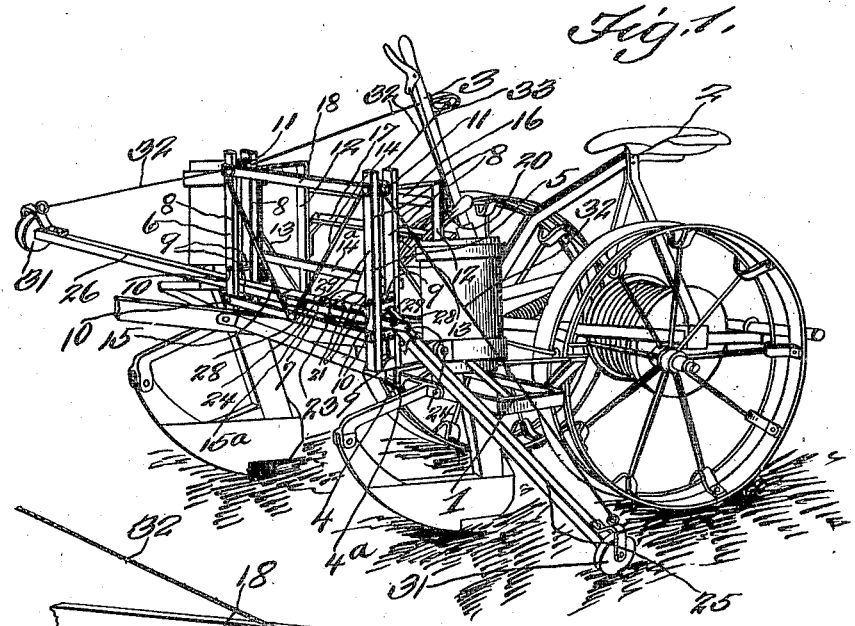
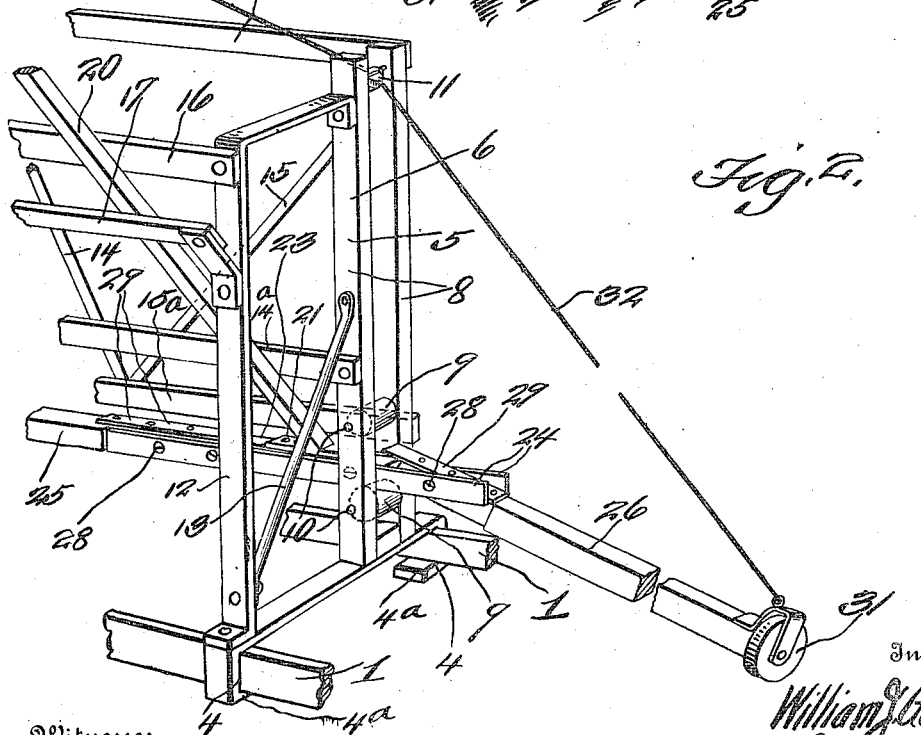

W. J. GOSNAY.
SHIFTING GUIDE FOR CORN PLANTERS.
APPLICATION FILED JULY 26, 1913.
1,078,846.
Patented Nov. 18, 1913.
2 SHEETS—SHEET 2.
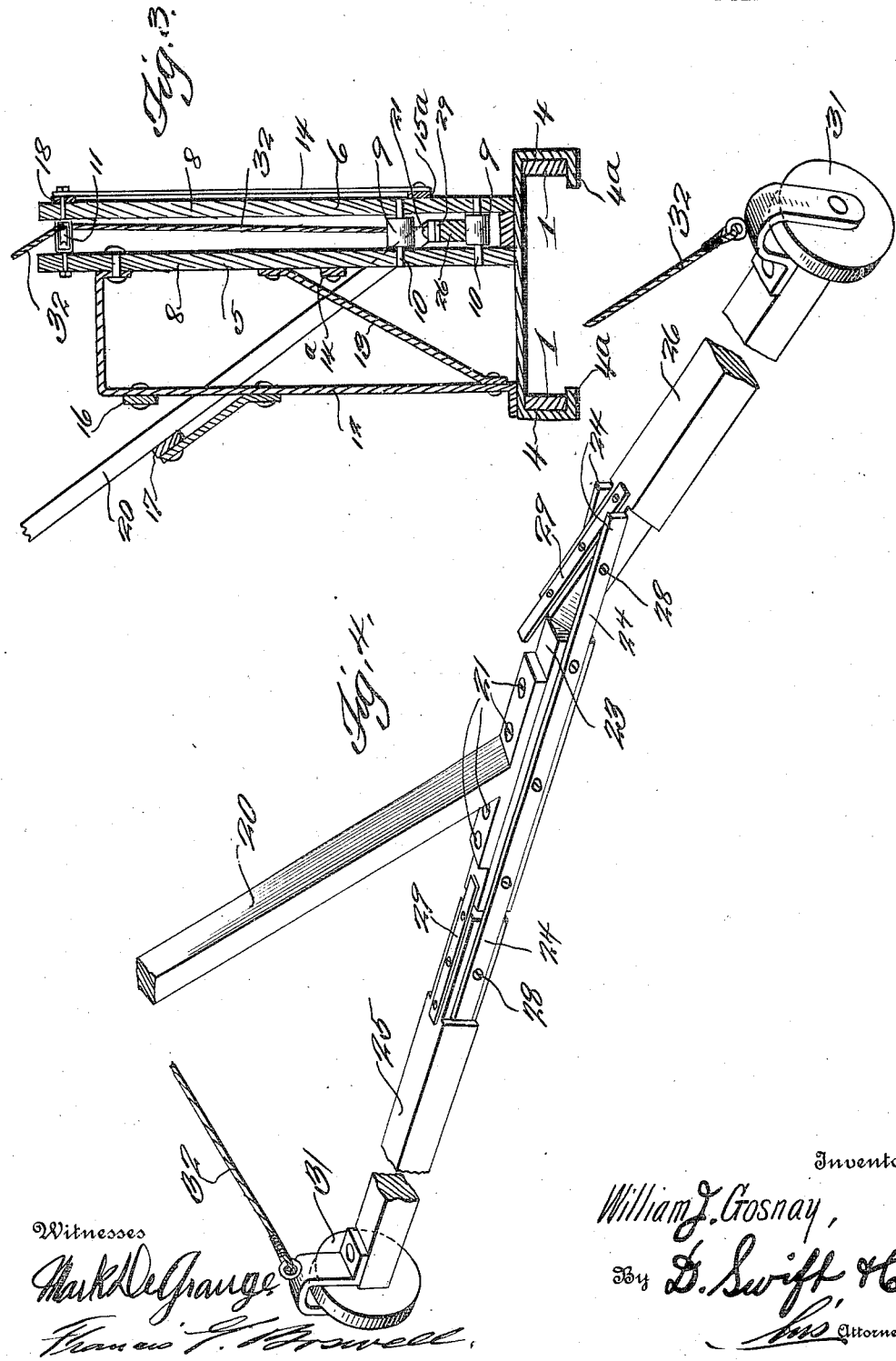

UNITED STATES PATENT OFFICE.

WILLIAM J. GOSNAY, OF ELIZABETH, ILLINOIS.

SHIFTING GUIDE FOR CORN-PLANTERS.

1,078,846.  Specification of Letters Patent.  Patented Nov. 18, 1913.

Application filed July 26, 1913. Serial No. 781,309.

*To all whom it may concern:*

Be it known that I, WILLIAM J. GOSNAY, a citizen of the United States, residing at Elizabeth, in the county of Jo Daviess and State of Illinois, have invented a new and useful Shifting Guide for Corn-Planters; and I do hereby declare the following to be a full, clear, and exact description of the invention, such as will enable others skilled in the art to which it appertains to make and use the same.

This invention relates to the art of corn planters, and particularly to a new and useful shifting guide bar.

It is an object of the invention to provide an efficient, simple and practical sectional guide bar, shiftable in guides carried by and forming a part of a frame (which is supplemental to the frame of the corn planter), in combination with means connecting the guide bar and an operating lever of the corn planter, so that when the operating lever is manipulated to raise the corn planter, one end or the other of the guide bar will be raised correspondingly.

A feature of the invention, is the provision of an arm guided and supported upon a support, for shifting the guide bar.

Heretofore the operator of a corn planter necessarily has to leave his seat, in order to shift the guide bar, therefore, it is the aim of this invention to dispose this arm in such position relative to the seat, as to provide a connection from the guide bar to the operating lever, in order that such inconvenience and disadvantage may be avoided.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view showing the application of the supplemental frame including the shiftable sectional guide bar as applied to a portion of a corn planter. Fig. 2 is a perspective view of the supplemental frame and the guide bar as removed from the corn planter. Fig. 3 is a sectional view through one end of the supplemental frame. Fig. 4 is an enlarged detail view of the shiftable sectional guide bar.

Referring more especially to the drawings, 1 designates the usual frame of a corn planter, which is provided with the usual seat 2, and operating lever 3, which is used for raising and lowering the corn planter. Secured to the frame of the planter, as shown at 4, is supplemental frame 5, which is provided with spaced apart guides 6 and 7, said guides comprise the bars 8, between which the rollers 9 are mounted upon the bolts 10. Arranged between the upper ends of the bars 8 swivelly are pulleys 11. One bar of each pair is braced or reinforced by the bars 12 and 13, while the other bars 8 of each pair are braced or reinforced relative to one another by the rods 14 and 15. The bars 12 form a part of the supplemental frame, and are braced by the bars 16 and 17. The guide bars 8 are additionally braced by the bar 18. The bar 17 acts as a support and guide, for an arm 20, which is bolted or otherwise secured to the intermediate section of the sectional guide bar, as at 21. The portion of the arm 20 which is secured to the sectional guide bar is T-shaped, as shown.

Bolted or otherwise secured to the intermediate section 23 of the sectional guide bar are metallic straps 24, between the ends of which the end sections 25 and 26 of the sectional guide bar are pivoted as at 28, the ends of the straps 29 limiting the end sections 25 and 26 in their upward movements. These end sections are provided with rollers at their free ends, which rollers 31 are adapted to engage the ground, in line with a mark in the soil, so as to guide the corn planter true to its work. The object of the operator is to keep his eye on the roller, so as to see that the planter will move parallel with the mark. Either one or the other of the end sections 25 and 26 may be lowered, so that its respective roller may engage the ground. When the planter reaches one end or the other of a row, the operator manipulates the operating lever, so as to raise the corn planter, in order to turn the same, and as the planter is raised, one or the other of the end sections 25 and 26 is correspondingly raised, owing to the end sections being connected to the lever by a cable or rope 32, the same engaging a pulley 33 on said lever. This cable or rope also passes over the swivelly mounted pulleys 11. When desired, one or the other of the end sections may be lowered into operative position, by moving the arm 20, which is guided upon and supported by the bar 17, it not necessitating the operator leaving his seat.

It is to be understood that the shiftable sectional guide bar, and its frame is applied to the forward portion of the corn planter, in front of the grain receptacle, but it may be arranged in the rear.

The invention having been set forth, what is claimed as new and useful is:—

1. In combination with a corn planter frame including an operating lever, a supplemental frame carried by the corn planter frame having oppositely arranged guides, anti-frictional rollers in said guide, a shiftable guide bar engaging said rollers, said shiftable guide bar comprising an intermediate section and two end sections pivoted to the intermediate section, either of said end sections adapted to engage the soil, by which the corn planter may be guided with relation to a mark in the soil, and connections between the end sections and the operating lever, whereby as the operating lever is manipulated to raise the corn planter one or the other of the end sections is correspondingly raised.

2. In combination with a corn planter frame including an operating lever, a supplemental frame carried by the corn planter frame having oppositely arranged guides, anti-frictional rollers in said guide, a shiftable guide bar engaging said rollers, said shiftable guide bar comprising an intermediate section and two end sections pivoted to the intermediate section, either of said end sections adapted to engage the soil, by which the corn planter may be guided with relation to a mark in the soil, and connections between the end sections and the operating lever, whereby as the operating lever is manipulated to raise the corn planter one or the other of the end sections is correspondingly raised, said supplemental frame having swivelly mounted pulleys at its upper end with which said connections engage, said supplemental frame having a supporting bar, and an arm carried by the intermediate section of the sectional guide bar supported upon the supporting bar for shifting the sectional guide bar.

In testimony whereof I have signed my name to this specification in the presence of two subscribing witnesses.

WILLIAM J. GOSNAY.

Witnesses:
W. L. McKENZIE,
S. B. REYNOLDS.